(12) United States Patent
Siedler

(10) Patent No.: US 8,992,839 B2
(45) Date of Patent: Mar. 31, 2015

(54) APPARATUS FOR A RADIAL-FLOW REACTOR AND METHOD FOR ASSEMBLY THEREOF

(71) Applicant: UOP LLC, Des Plaines, IL (US)

(72) Inventor: Nathan Siedler, Des Plaines, IL (US)

(73) Assignee: UOP LLC, Des Plaines, IL (US)

( * ) Notice: Subject to any disclaimer, the term of this patent is extended or adjusted under 35 U.S.C. 154(b) by 237 days.

(21) Appl. No.: 13/852,687

(22) Filed: Mar. 28, 2013

(65) Prior Publication Data

US 2014/0294684 A1  Oct. 2, 2014

(51) Int. Cl.
| | |
|---|---|
| B01J 19/30 | (2006.01) |
| B01J 19/00 | (2006.01) |
| B01J 8/02 | (2006.01) |

(52) U.S. Cl.
CPC ...... *B01J 8/0214* (2013.01); *B01J 2208/00884* (2013.01)
USPC ............................................. 422/129

(58) Field of Classification Search
CPC .............. B01J 8/00; B01J 8/0015; B01J 8/02; B01J 8/0207; B01J 8/0214; B01J 8/242; B01J 8/0257; B01J 19/00; B01J 19/0053; B01J 19/30; B01J 19/305; B01J 2208/00; B01J 2208/00743; B01J 2208/00752; B01J 2208/00761; B01J 2208/00769; B01J 2208/00796; B01J 2208/00884

See application file for complete search history.

(56) References Cited

U.S. PATENT DOCUMENTS

| | | | |
|---|---|---|---|
| 3,647,680 A |  | 3/1972 | Greenwood |
| 3,692,496 A |  | 9/1972 | Greenwood |
| 3,706,536 A |  | 12/1972 | Greenwood |
| 5,130,106 A |  | 7/1992 | Koves |
| 5,372,792 A | * | 12/1994 | Mueller et al. ................ 422/218 |
| 5,759,242 A | * | 6/1998 | Smolarek et al. ............... 96/149 |

OTHER PUBLICATIONS

U.S. Appl. No. 13/852,640 (Siedler), filed Mar. 28, 2013.
U.S. Appl. No. 13/852,596 (Siedler), filed Mar. 28, 2013.
U.S. Appl. No. 13/852,771 (Siedler), filed Mar. 28, 2013.

\* cited by examiner

*Primary Examiner* — Natasha Young

(57) ABSTRACT

An apparatus for a radial-flow reactor according to various approaches includes an inner partition assembly having an inwardly tapered bottom portion. According to various approaches, an inner partition assembly support includes a socket with a tapered upper rim. A process according to various aspects includes assembling a radial-flow reactor by installing an inner partition assembly by aligning a bottom portion of the inner partition assembly with an opening of a inner partition assembly support socket and lowering the bottom portion into the opening.

16 Claims, 3 Drawing Sheets

APPARATUS FOR A RADIAL-FLOW REACTOR AND METHOD FOR ASSEMBLY THEREOF

FIELD OF THE INVENTION

The subject invention relates to an apparatus for a radial-flow reactor and a method for assembling a radial-flow reactor. More specifically, the invention relates to a method and apparatus for installing an inner partition assembly within an outer partition assembly for a radial-flow reactor during assembly thereof

BACKGROUND OF THE INVENTION

A wide variety of processes use radial or horizontal flow reactors to effect the contact of particulate matter with a gaseous stream. These processes include hydrocarbon conversion adsorption and exhaust gas treatment. In most of these processes, contact of the particulate material with the fluid decreases the effectiveness of the particulate material in accomplishing its attendant function. In order to maintain the effectiveness of the process, a system has been developed whereby particulate material is semi-continuously withdrawn from the contacting zone and replaced by fresh particulate material so that the horizontal flow of fluidized material will constantly contact particulate material having a required degree of effectiveness. Typical examples and arrangements for such systems can be found in U.S. Pat. Nos. 3,647,680, 3,692,496 and 3,692,496, 3,706,536, and 5,130, 106.

A good example of the way in which moving bed apparatus has been used for the contacting of fluids and solids is found in the field of petroleum and petrochemical processes especially in the field the hydrocarbon conversion reactions. One such process that uses a radial-flow bed for the contact of solid catalyst particles with a vapor phase reactant stream is found in the dehydrogenation of light paraffins to form olefins. This process uses one or more reaction zones where the catalyst particles enter the top of the reactor and flow downwardly under gravity flow and are transported out of the first reactor. In many cases, a second reactor is located either underneath or next to the first reactor. Catalyst particles again move through the second reactor under gravity flow. After passing through the second reactor, the catalyst particles can go through a further series of reaction zones and are collected and transported to a regeneration vessel for the restoration of the catalyst particles by the removal of coke and other hydrocarbon by-products that are produced in the reaction zone and accumulate on the catalyst. In the dehydrogenation of hydrocarbons using the moving bed system, the reactants typically flow serially through the one or more reaction zones. The dehydrogenation reaction is typically endothermic so the reactant stream is heated before each reaction zone to supply the necessary heat for the reaction. The reactants flow through each reaction zone in a generally horizontal direction through a bed of catalyst. In most cases the catalyst bed is arranged in an annular form so that the reactants flow radially through the catalyst bed. Many other hydrocarbon conversion processes can also be effected with a system for continuously moving catalyst particles under gravity flow through one or more reactors having a horizontal flow of reactants. One such process is the reforming of naphtha. The catalyst particles in each reaction zone are retained between an inlet screen and an outlet screen that together form a vertical bed and allow the passage of vapor through the bed.

Radial-flow reactors typically include a reactor shell with an annular catalyst retention space. Gaseous fluid flows either radially inwardly or outwardly through the annular catalyst retention space to contact the gas with the solid catalyst within the catalyst retention space. The annular catalyst retention space is typically defined by a partition assembly including some type of screened surface. The screened surface is for holding catalyst beds in place and for aiding in the distribution of pressure over the surface of the reactor to facilitate radial flow through the reactor bed. The screen may include, for example a mesh, either wire or other material, or a perforated or punched plate. The screened surface includes an inner screen and an outer screen with the catalyst retention space defined therebetween. For a moving bed, the screen or mesh provides a barrier to prevent the loss of solid catalyst particles while allowing fluid to flow through the bed. In moving bed systems, catalyst particles are typically introduced at the top of the reactor, and flow downward through the catalyst retention space and are removed at the bottom through catalyst removal nozzles or ports. Typically catalyst transfer pipes communicate with the catalyst retention space and extend through the catalyst removal ports to facilitate the flow of the moving bed of catalyst out of the catalyst retention space where it can be transferred to another reactor, regenerated in a regeneration portion of the process, or removed from the system. The screens and the catalyst transfer pipes are preferably constructed of a non-reactive material, but in reality the material often undergoes some reaction through corrosion, and over time problems arise from the corroded screen or mesh.

In order to minimize corrosion of the screens and transfer pipes and damage to the catalyst particles, the catalyst contact surfaces of the screens and catalyst transfer pipes are typically designed to provide a generally smooth surface over which the catalyst particles can flow. For example, in some reactors wires of the screens have a wedge shape with the flat face facing the catalyst retention area for minimal attrition with respect to catalyst particles which are moving downwardly by gravity during use.

Experience has shown that it is difficult to assemble radial flow reactors due to their large sizes and mating parts that preferably fit together with tight tolerance specifications and minimal obstruction or resistance to the flow of catalyst once the reactor is assembled. For example, once a portion of the reactor shell is in place, a crane may be utilized to individually lift and lower an outer screen assembly and inner screen assembly into place. During installation, an annular depending flange of the inner partition assembly must be aligned with the opening of a socket within the outer screen and lowered into the socket. Cranes often have difficulty positioning the inner screen directly over the socket and ensuring that the inner screen hang perfectly level during installation. Leveling the inner screen relative to the socket is further complicated, because it is difficult to fabricate the socket on the outer screen perfectly level. Field workers often force the inner screen assembly into place. This adds to the work and time necessary of installing the reactor internals. Further, the screens can be damaged if care is not taken while installing them.

SUMMARY OF THE INVENTION

By one aspect, an apparatus is provided for a radial-flow reactor. The apparatus includes a generally annular outer partition assembly. The apparatus also includes a generally annular inner partition assembly support defining a socket radially inward of the outer partition. The socket has an upper rim. The apparatus also includes a generally annular inner partition assembly including an inner partition and a base for being supported by the upper rim. A generally annular flange depends from the inner partition assembly base and is configured to fit within an opening of the socket. The flange has an inwardly tapered bottom edge portion. By another aspect, an apparatus includes an upper rim as described above. The upper rim includes a tapered inner edge portion.

By another aspect a method is provided for assembling a radial-flow reactor that includes lowering an inner partition assembly into an outer partition assembly. The method further includes contacting a bottom edge portion of an annular flange of the inner partition assembly with a tapered support rim inner edge portion of a socket with the outer partition assembly. The method includes sliding the bottom edge portion along the tapered support rim inner edge portion to shift the annular flange into alignment with an opening of the socket. Finally, the method includes lowering the flange into the socket opening to install the inner partition assembly. By another aspect, a method includes contacting an inwardly tapered bottom edge portion of an annular flange of an inner partition assembly with a support rim inner edge portion. The method includes sliding the tapered edge portion along the support rim inner edge portion to shift the annular flange into alignment with an opening of the socket, and lowering the annular flange into the socket to install the inner partition assembly.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
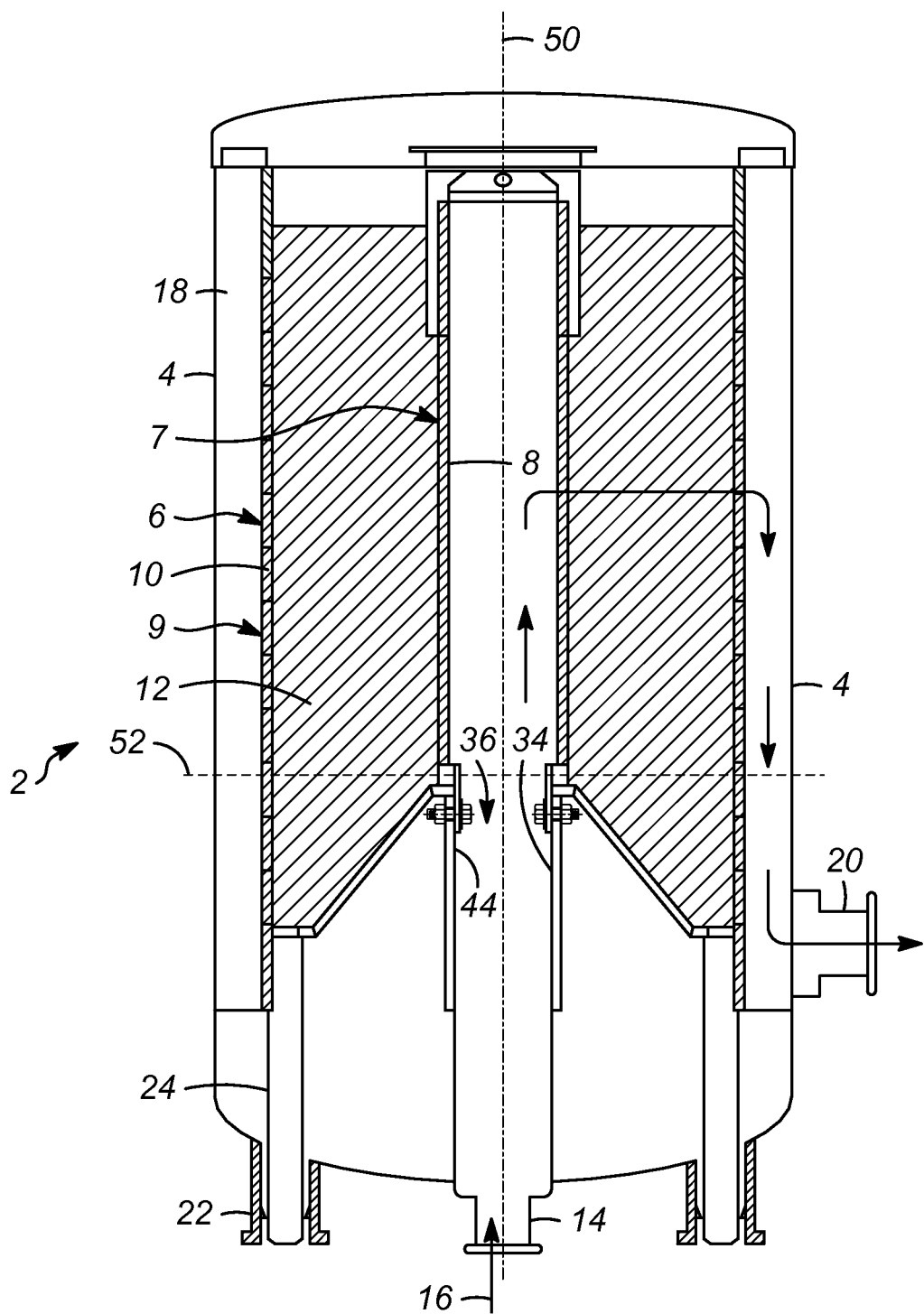
FIG. 1 is a cross-sectional view of a radial-flow reactor system in accordance with various embodiments.

The method and apparatus in accordance with various aspects relates to the assembly of a radial-flow reactor. Turning to FIG. 1, a radial-flow reactor 2 in accordance with one aspect is illustrated that includes inner and outer annular partitions for supporting an annular bed of solid material therebetween. The reactor 2 according to one aspect includes a reactor shell 4 and an annular partition assembly 6. The partition assembly 6 includes a generally annular inner partition assembly 7 with an annular inner partition 8 in the form of, for example, an inner screen defining a centerpipe. The partition assembly also includes an outer partition assembly 9 with an annular outer partition 10, for example, in the form of an outer screen. Unless noted otherwise, it is noted that the term annular as used herein, refers to a structure that is generally annular in cross section, although it is not necessarily a perfectly round structure, and may include, for example, a circular, oval, or polygonal cross-section. An annular catalyst retention space 12 between the inner and outer screens partitions 8 and 10 for retaining a solid particle, or catalyst, is defined by the inner and outer partitions 8 and 10 of the partition assembly 6. The reactor 2 by one aspect is configured so that during operation fluid enters the reactor 2 through an inlet 14 at the bottom of the reactor and travels upwardly through the centerpipe in the direction indicated by arrow 16. As the fluid flows upwardly, portions of the fluid shift radially and travel generally radially through the centerpipe, into the catalyst retention space 12, through a catalyst bed contained therein, where the fluid contacts the catalyst and reacts to form a product stream. The product stream flows radially outwardly through the outer partition 10 and into annular space 18 between the outer partition 8 and the reactor shell 4. The product stream is collected in the annular space 18 and passes through a reactor outlet 20.

During operation, the particulate material or catalyst typically flows through the catalyst retention space 12 to provide a moving bed of catalyst. The flow of the catalyst may be assisted by gravity by flowing downwardly through the retention space 12. The catalyst material is subsequently removed through the bottom of the reactor in order to be transferred downstream, regenerated, or discarded. Thus, catalyst transfer ports 22 may be provided at the base of the reactor 2 and catalyst transfer pipes 24 may extend through the transfer ports 22 in order to provide fluid communication with the catalyst retention space 12 and facilitate the flow of catalyst through the catalyst transfer pipes.

Other configurations of a radial flow reactor are also contemplated herein, such as, for example, the reactor 2 may be configured to have an opposite flow pattern as that illustrated in FIG. 1 such that reactant fluid enters through an inlet into annular space between the reactor shell and the outer partition and flows radially inwardly through the catalyst retention space where it contacts the catalyst and reacts to form a product stream. The product stream flows radially inwardly through the center pipe where it is collected in the centerpipe and exits through the outlet. Other configurations of the reactor and flow are also possible and contemplated herein.

By one aspect, an outer partition assembly 9 is generally annular and includes an annular outer partition 10. The outer partition assembly 9 is configured to be mounted within the radial-flow reactor 2 about a center axis thereof. By one example, the outer partition includes an outer screen to retain catalyst and facilitate the flow of reactants radially through the screen.

By one aspect, an annular inner partition assembly 7 is provided that includes an annular inner partition 8. In one example, the annular inner partition 8 includes an inner screen to retain catalyst and facilitate the flow of reactants radially through the screen. The annular inner partition assembly may also include a lower base portion 26 for supporting the inner partition 8 thereabove and to facilitate installation of the inner partition assembly into the reactor 2. By one approach, the base portion 26 includes a generally annular base 28 below the inner partition 8 that may extend about a bottom portion of the inner partition 8. The base 28 also includes flange 30 depending from and inner edge of the base 28. The flange 30 may be an annular flange and it may extend continuously about the base 28 or it may include a series of flanges spaced about the annular base. As described further below, the flange can be used for positioning as well as mounting the inner partition assembly 7 within the reactor 2.

Figure 2:
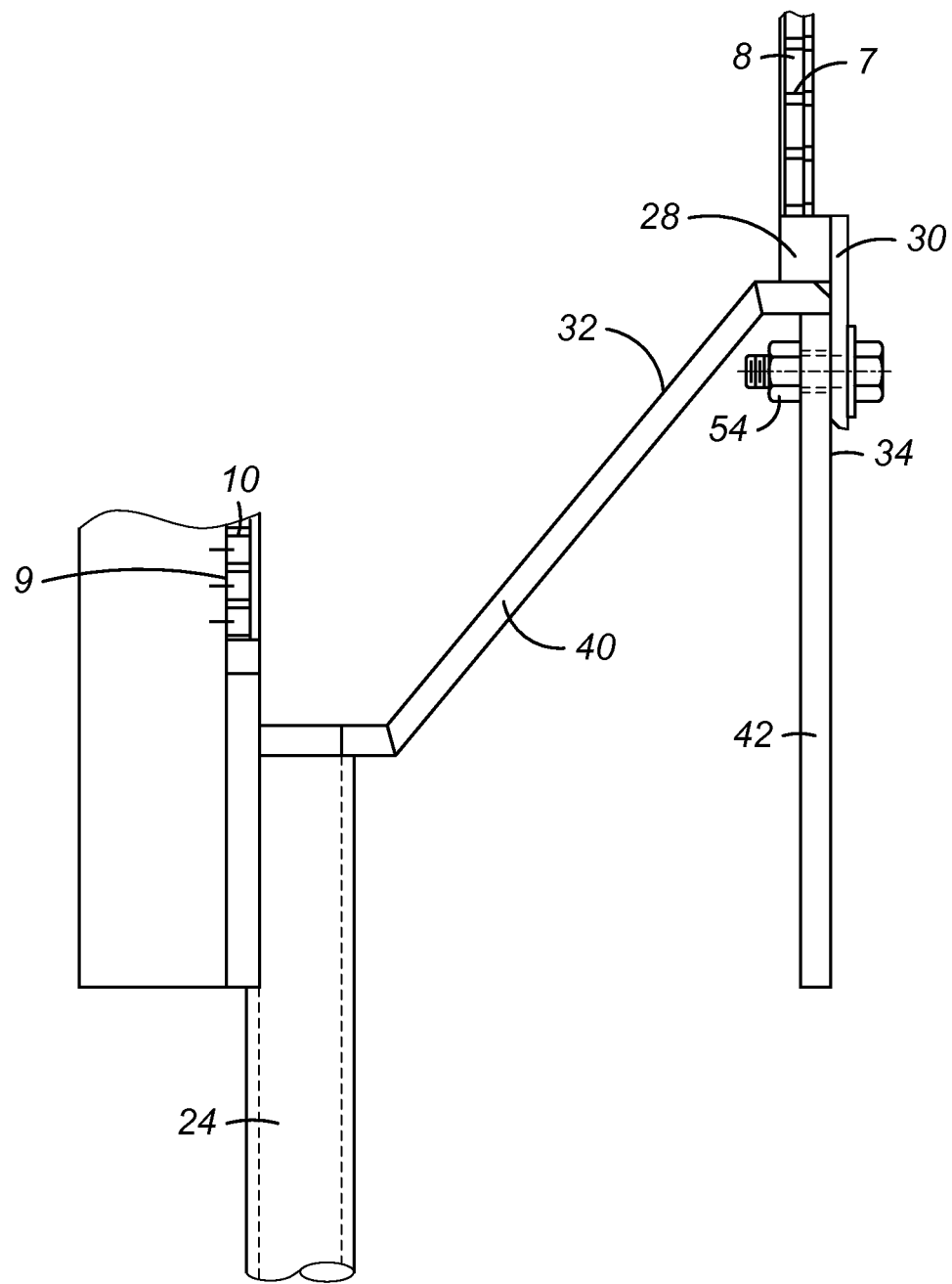
FIG. 2 is a partial cross-sectional view of a portion of a partition assembly in accordance with various embodiments.
Figure 3:
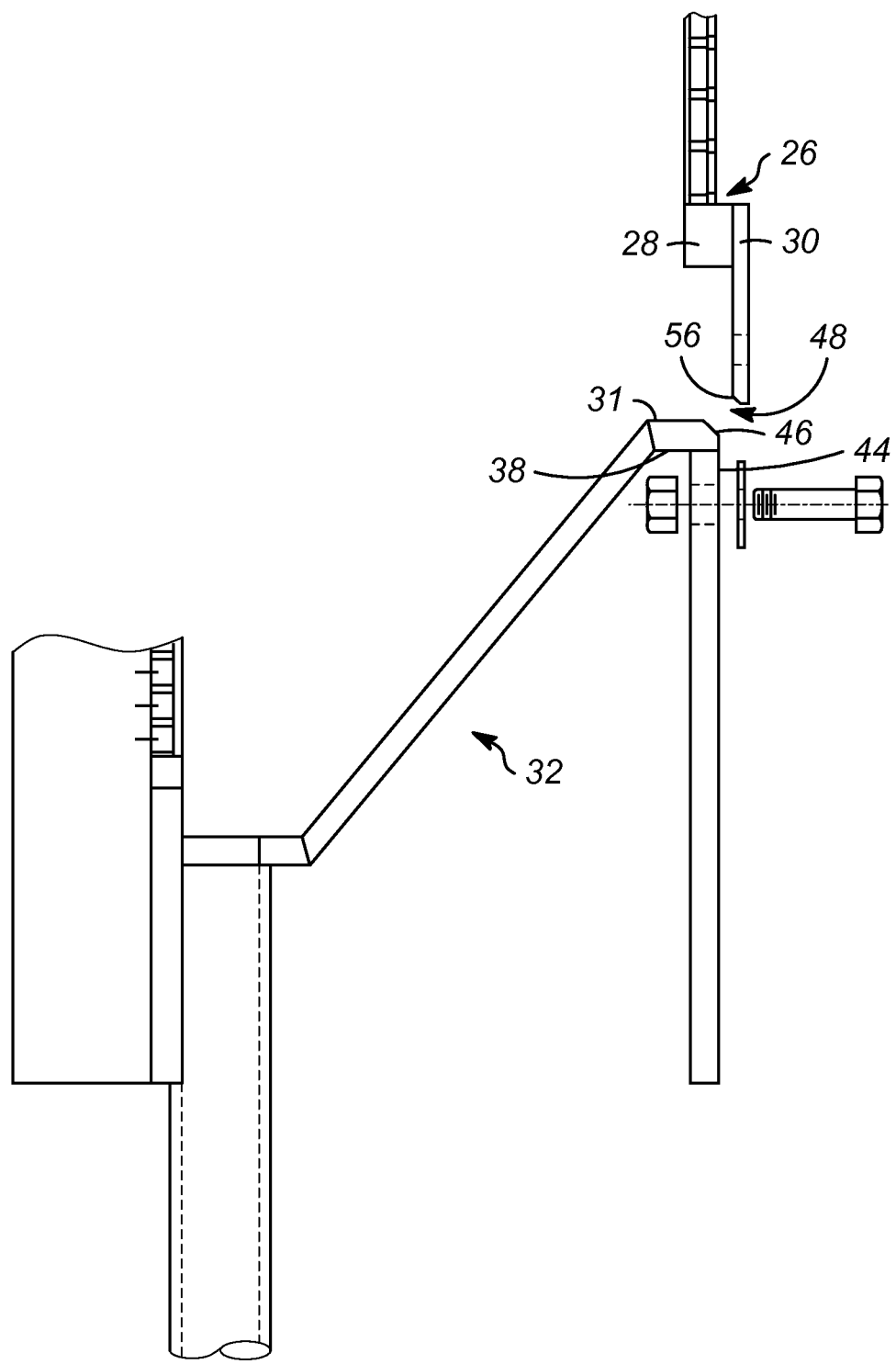
FIG. 3 is a cross-sectional view of a portion of an inner partition assembly and an outer partition assembly during assembly.

By one aspect, an inner partition assembly support 32 is positioned within the outer partition assembly 9 and is provided for supporting the inner partition assembly 7 thereon. The support 32 may be mounted to and a part of the outer partition assembly 9 or may be mounted to a portion of the reactor 2 or reactor internals. As illustrated in FIGS. 2 and 3, the support 32 includes an upper support surface for supporting the base 32 and defines a socket 34 having a socket opening 36 into which the flange of the inner partition assembly 7 can be aligned and inserted. The upper support surface may include an upper rim 38 about the socket. The upper rim 38 may be formed from a support plate, and as mentioned may be mounted to the outer partition assembly 9 such as by inclined support plate 40, which may also extend annularly and define a lower portion of the catalyst retention space 12. Further support may be provided, for example by a vertical support plate 42, which may also have an annular configuration. As illustrated in FIGS. 2-3, vertical support plate may extend in the generally longitudinal direction with regard to the reactor 2 and may define an inner surface 44 of the socket 34.

By one aspect, the socket upper rim 38 includes an inner edge portion 46 that is tapered at a decline. The upper rim 38 may include a support portion 48, with the tapered inner edge portion 46 extending therefrom at a decline toward the socket opening 36. In this regard, during installation of the inner partition assembly 7 into the outer partition assembly 9, an outer bottom edge portion 48 of the annular flange may be contacted with the tapered inner edge portion 46 to shift the flange 30 into alignment with the socket opening 36. The inner partition assembly 7 may be further lowered to lower the flange 30 into the socket opening 36 to install the inner partition assembly 7.

In one example, the tapered inner edge portion 46 includes a tapered surface 47 at an angle of between about 10 degrees and about 80 degrees, between about 30 degrees and about 60 degrees in another example, and between about 40 degrees and about 50 degrees in another example, relative to a longitudinal axis 50 of the outer partition assembly 9 as illustrated in FIG. 1. The radial axis 52, as used herein, refers to an axis that is perpendicular to the longitudinal axis 50. It should be noted that for simplicity, with regard to FIG. 1, the inner and outer partition assemblies 7 and 9 are illustrated as being coaxial and sharing a common longitudinal axis 50 and radial axis 52. However, it should be appreciated that during installation and in practice once the reactor 2 is assembled, the inner and outer partition assemblies 7 and 9 may not be coaxial.

During installation of the inner partition assembly 7, the bottom edge portion 48 of the annular flange 30 may be lowered until it contacts the tapered support rim inner edge portion 46. It should be understood that by further lowering the inner partition assembly 7, the bottom edge portion 48 of the flange 30 will slide along the tapered support rim inner edge portion 46 toward the socket opening 36. By one approach, the inner partition assembly 7 may be further lowered until so the flange 30 is installed in the socket opening 36 and bears against the socket inner surface 44. With the inner partition assembly 7 installed, the bottom portion of the inner partition base 28 is seated on the support rim upper surface 31. By one approach, with the inner partition installed, the base 28 covers the tapered support rim inner edge portion 46 so it does not interfere with the flow of catalyst through the catalyst retention space 12 during operation. With the inner partition assembly 7 installed, the flange 30 may be fastened to the socket 34 by appropriate fastening device, such as bolt 54.

By another aspect, the flange 30 of the inner partition assembly 7 may include an inwardly tapered bottom edge portion 48 as illustrated in FIGS. 2-3. In this regard, during installation, the inner partition assembly 7 may be lowered until the inwardly tapered bottom edge portion 48 contacts the support rim inner edge portion 46. The inwardly tapered bottom edge portion 48 may then be slid along the support rim inner edge portion 46 to shift the annular flange 30 into alignment with the socket opening 36. The flange may then be lowered into the socket 34 to install the inner partition assembly 7.

In one example, the inwardly tapered bottom edge portion 48 includes an inwardly tapered surface 56 at an angle of between about 10 degrees and about 80 degrees, between about 30 degrees and about 60 degrees in another example, and between about 40 degrees and about 50 degrees in yet another example, relative to a longitudinal axis 50 of the inner partition assembly 7.

By one aspect, both the inner edge portion 46 of the support rim 38 and the bottom edge portion 48 of the flange 30 are tapered to further facilitate aligning the flange with the socket opening 36 to install the inner partition assembly 7 within the outer partition assembly 9. In this regard, installing the inner partition assembly 7 includes contacting the inwardly tapered bottom edge portion 48 of the flange 30 with the tapered support rim inner edge portion 46 and sliding the inwardly tapered bottom edge portion 48 along the tapered support rim inner edge portion 46 toward the socket opening 36.

The above description and examples are intended to be illustrative of the invention without limiting its scope. While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

The invention claimed is:

1. An apparatus for a radial-flow reactor, comprising:
    a generally annular outer partition assembly including an outer partition;
    a generally annular inner partition assembly support having an upper rim defining a socket positioned radially inward of the outer partition;
    an upper rim of the socket;
    a generally annular inner partition assembly including an inner partition and a base for being supported by the upper rim;
    a generally annular flange depending from the inner partition assembly base and configured to fit within an opening of the socket; and
    an inwardly tapered bottom edge portion of the flange.

2. The apparatus of claim 1, wherein the inwardly tapered bottom edge portion includes an inwardly tapered surface at an angle of between about 30 degrees and about 60 degrees relative to a longitudinal axis of the inner partition assembly.

3. The apparatus of claim 1, wherein the inwardly tapered bottom edge portion includes an inwardly tapered surface at an angle of between about 40 degrees and about 50 degrees relative to a longitudinal axis of the inner partition assembly.

4. The apparatus of claim 1, wherein the inner partition and the outer partition includes one or more screens.

5. The apparatus of claim 1, wherein the inner partition support rim includes a tapered inner edge portion.

6. The apparatus of claim 5, wherein the tapered inner edge portion includes a tapered surface at an angle of between about 30 degrees and about 60 degrees below a radial axis of the outer partition assembly.

7. The apparatus of claim 5, wherein the tapered inner edge portion includes a tapered surface at an angle of between about 40 degrees and about 50 degrees below a radial axis of the outer partition assembly.

8. The apparatus of claim 5, wherein the inner partition base is supported by the inner partition support rim and covers the inner partition support rim tapered inner edge portion with the inner partition assembly installed in the outer partition assembly.

9. The apparatus of claim 1, wherein the inner partition and the outer partition define a catalyst retention space therebetween with the inner partition installed radially inwardly of the outer partition.

10. The apparatus of claim 9, wherein the inwardly tapered bottom edge portion of the flange is positioned outside of the catalyst retention space.

11. The apparatus of claim 1, wherein the outer partition assembly includes the inner partition support rim.

12. The apparatus of claim 1, further comprising a fastener for fastening the flange to an inner wall of the socket.

13. An apparatus for a radial-flow reactor, comprising:
   a generally annular outer partition assembly including an outer partition;
   a generally annular inner partition assembly support having an upper rim defining a socket positioned radially inward of the outer partition;
   an upper rim of the socket;
   a generally annular inner partition assembly including an inner partition and a base for being supported by the upper rim;
   a generally annular flange depending from the inner partition assembly base and configured to fit within the socket; and
   a tapered inner edge portion of the inner partition support rim.

14. The apparatus of claim 13, wherein the tapered inner edge portion includes a tapered surface at an angle of between about 30 degrees and about 60 degrees below a radial axis of the outer partition assembly.

15. The apparatus of claim 13, wherein the tapered inner edge portion includes a tapered surface at an angle of between about 40 degrees and about 50 degrees below a radial axis of the outer partition assembly.

16. The apparatus of claim 13, wherein the inner partition base covers the inner partition support rim tapered inner edge portion.

* * * * *